(12) United States Patent
Edomwonyi

(10) Patent No.: US 6,509,047 B2
(45) Date of Patent: Jan. 21, 2003

(54) MICROWAVABLE PACKAGE CONTAINING A SNACK FOOD AND TOPPING

(76) Inventor: Kim Y. Edomwonyi, 1672 Ezra Church Rd., Atlanta, GA (US) 30314

( * ) Notice: Subject to any disclaimer, the term of this patent is extended or adjusted under 35 U.S.C. 154(b) by 142 days.

(21) Appl. No.: 09/771,663

(22) Filed: Jan. 30, 2001

(65) Prior Publication Data

US 2002/0102334 A1 Aug. 1, 2002

(51) Int. Cl.$^7$ .............................................. B65D 81/34
(52) U.S. Cl. ..................... 426/107; 426/113; 426/120; 426/234; 206/219; 219/725; 219/734; 229/120.08; 229/120.21
(58) Field of Search ................................ 426/107, 120, 426/113, 234; 219/725, 726, 729, 730, 734; 206/219; 229/120.08, 120.21

(56) References Cited

U.S. PATENT DOCUMENTS

| | | | | |
|---|---|---|---|---|
| 3,983,256 A | * | 9/1976 | Norris et al. ................. | 426/90 |
| 4,166,208 A | * | 8/1979 | Martel et al. .............. | 99/323.5 |
| 4,233,325 A | * | 11/1980 | Slangan et al. ............. | 426/120 |
| 4,496,816 A | * | 1/1985 | McNamara ................. | 426/120 |
| 4,563,561 A | * | 1/1986 | Vaeth et al. ................. | 426/120 |
| 4,794,008 A | | 12/1988 | Schmidt et al. | |
| 4,803,088 A | | 2/1989 | Yamamoto et al. | |
| 4,908,222 A | | 3/1990 | Yu | |
| 4,924,048 A | | 5/1990 | Bunce et al. | |
| 4,942,277 A | * | 7/1990 | Narberes ................. | 99/323.5 |
| 5,241,150 A | * | 8/1993 | Garvey et al. .............. | 426/234 |
| 5,300,748 A | | 4/1994 | Colombo | |
| 5,315,083 A | | 5/1994 | Green | |
| 5,416,305 A | * | 5/1995 | Tambellini .................. | 426/120 |

FOREIGN PATENT DOCUMENTS

| | | | | |
|---|---|---|---|---|
| EP | 497553 | * | 8/1992 | ................. 426/107 |
| GB | 2201070 | * | 8/1988 | ................. 426/107 |
| GB | 2239378 | * | 6/1991 | ................. 426/107 |
| GB | 2307159 | * | 5/1997 | ................. 426/107 |
| JP | 7-2280 | * | 1/1995 | ................. 426/120 |
| JP | 9-51767 | * | 2/1997 | ................. 426/120 |
| WO | WO90/08710 | * | 8/1990 | ................. 426/120 |

* cited by examiner

Primary Examiner—Steve Weinstein
(74) Attorney, Agent, or Firm—Siemens Patent Services, LC

(57) ABSTRACT

Snacks such as tortilla chips with melted nacho cheese toppings have become increasingly popular in recent years, and the dispensing of such snacks, as a single unit, in microwavable packages, for either home or vending stand use is desirable. A major problem with packaging cheese and chips in contact with one another in a single container, however, is that over time the chips, which are a low moisture content food, would draw moisture from the cheese, causing them to become soggy. The present invention remedies this problem by separating the cheese from the chips by containing it in an open grid integrated into the package top in such a way that when microwaved, the cheese will melt and be evenly distributed over the chips.

6 Claims, 3 Drawing Sheets

MICROWAVABLE PACKAGE CONTAINING A SNACK FOOD AND TOPPING

BACKGROUND OF THE INVENTION

1. Field of the Invention

The present invention relates to the prepared foods industry, especially as it relates to pre-packaged, microwavable foods. More particularly, the invention comprises microwavable retail package for tortilla chips and nacho cheese, wherein the chips are kept isolated from the cheese until the cheese is melted, thereby preventing the chips from absorbing moisture from the cheese during storage.

2. Description of the Prior Art

Since the advent of the microwave oven, the variety of foods which are prepared specifically for microwave heating has increased dramatically. As a result of this increased variety, different heating systems have been developed to allow for the efficient use of limited microwave space and for the simultaneous heating of foods with different microwave cooking times.

U.S. Pat. No. 5,315,083, issued to Robert E. Green on May 24, 1994, presents a MICROWAVE COOKING UTENSIL for simultaneously heating two different foods having different microwave absorbing properties. Green's utensil is comprised of two vessels, basically frusto-conically shaped, nesting one within the other. A food requiring a longer microwave cooking time is placed within the outer vessel, leaving a cavity in the center. A second food requiring a shorter microwave cooking time is placed within the second vessel, which in turn is placed into the cavity at the center of the first vessel. Both vessels may be covered with a steam venting lid. The food in the first vessel absorbs the bulk of the microwave energy while the food in the second vessel absorbs a lesser amount, tending to equalize cooking time for the two foods. Green's utensil is of a durable nature while the present invention is intended as a disposable retail package.

U.S. Pat. No. 5,300,748, issued to Edward A. Colombo on Apr. 5, 1994, presents a RECYCLABLE MICROWAVABLE CONTAINER WITH A HINGED REMOVABLE OUTER SHELL comprising an inner vessel and an outer vessel of two different polymeric materials such that the inner vessel is capable of sustaining high cooking heats while the outer vessel remains relatively cool to the touch due to an air gap between the two vessels and a lower heat absorption capacity of the outer vessel. The two vessels are hingedly attached in the molding process in such a way that they are easily separated for recycling of the different polymers. A separate polymeric lid seals the container. While Colombo presents two vessels, his container is intended for a single item of food, where the present invention is intended to separate two different items of food.

U.S. Pat. No. 4,924,048, issued to Martin C. Bunce, et. al., on May 8, 1990, presents a TRAY FOR USE IN MICROWAVE OVENS WITH HEAT SEALED COVER AND INNER LID, a vessel for heating a commercially prepared microwavable food. Bunce presents a tray with substantially vertical walls and a flange around the upper limit of the walls. An outer lid is heat sealed to the flange. An inner lid, preferably transparent and having vent holes is supported by a step around the inner surface of the vertical wall, rising to the level of the outer lid, providing support to the outer lid. Bunce provides a single chambered tray, while the present invention provides two chambers for maintaining separation of different items of food until use.

U.S. Pat. No. 4,908,222, issued to Doug Yu on Mar. 13, 1990 presents a MICROWAVE BREWING APPARATUS AND METHOD, a dual chambered beverage device in which water is placed into an upper vessel and coffee grounds or other infusible beverage mix into the lower vessel. The upper vessel has a twist seal lid. Water placed in the upper vessel, which is then sealed with a lid. The water is heated by microwave energy. As it heats, pressure builds forcing the heated water through an inverted U having its highest point above the water level within the vessel. The heated water passes through the infusible material in the lower vessel and is collected in a cup or other receptacle placed below the lower vessel. Yu presents a hot beverage brewing device, while the present invention offers a food warming device.

U.S. Pat. No. 4,803,088, issued to Massanori Yamamoto, et. al., on Feb. 7, 1989, presents a CONTAINER PACKED WITH INSTANT FOOD FOR USE IN MICROWAVE OVEN, in which a second container, such as a retort pouch, is packed within a first container. Yamamoto offers a dry instant food which can be re-hydrated by opening the second container and adding its liquid contents to the dry contents of the first container, which is substantially re-sealable, and heating in a microwave until the liquid is absorbed by the dry food. On the other hand, the present invention offers a method of preparing the combination of tortilla chips and nacho cheese without first opening the package.

U.S. Pat. No. 4,794,008, issued to Walter L. Schmidt, et. al., on Dec. 27, 1988, presents a METHOD OF PREPARING A PACKAGED FROZEN CONFECTION, comprising a pair of containers (much as a cup and domed lid) in which one vessel is microwave conducive and the second is microwave reflective. A frozen confection, such as ice cream and hot fudge, may be packaged such that, on microwaving, the frozen hot fudge will be thawed while the ice cream remains substantially frozen, allowing the hot fudge to run from its upper container to cover the ice cream in the lower container. While Schmidt presents a container which allows on vessel's contents to be thawed while maintaining the contents of the second vessel in a frozen state, the present invention provides for heating both vessels while keeping their contents separated during storage.

None of the above inventions and patents, taken either singly or in combination, is seen to describe the instant invention as claimed.

SUMMARY OF THE INVENTION

Snacks such as tortilla chips with melted nacho cheese toppings have become increasingly popular in recent years, and the dispensing of such snacks, as a single unit, in microwavable packages, for either home or vending stand use is desirable. A major problem with packaging nacho cheese and chips in contact with one another in a single container, however, is that over time the chips, which are a low moisture content food, draw moisture from the cheese, causing them to become soggy. This problem could be remedied by packaging the cheese and/or the chips in an inner package, but this entails both the additional expense in packaging and additional steps in the preparation of the product for consumption.

Accordingly, it is a principal object of the invention to provide a microwavable snack of tortilla chips and nacho cheese in a single, convenient package.

It is another object of the invention to provide a microwavable snack of tortilla chips and nacho cheese in a package which will isolate them one from the other until time of consumption to prevent moisture transfer from one to the other.

Still another object of the invention is to provide a microwavable snack of tortilla chips and nacho cheese in a container which will evenly distribute melted nacho cheese over the tortilla chips.

It is a further object of the invention to provide a microwavable snack of tortilla chips and nacho cheese which can be served in its packing container.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Snacks such as tortilla chips with melted nacho cheese toppings have become increasingly popular in recent years, and the dispensing of such snacks, as a single unit, in microwavable packages, for either home or vending stand use is desirable. A major problem with packaging nacho cheese and chips in contact with one another in a single container, however, is that over time the chips, which are a low moisture content food, would draw moisture from the cheese, causing them to become soggy. This problem could be remedied by packaging the cheese and/or the chips in an inner package, but this entails both the additional expense in packaging and additional steps in the preparation of the product for consumption. The present invention remedies this problem by separating the cheese from the chips in such a way that when microwaved, the cheese will melt and be evenly distributed over the chips.

Figure 1:
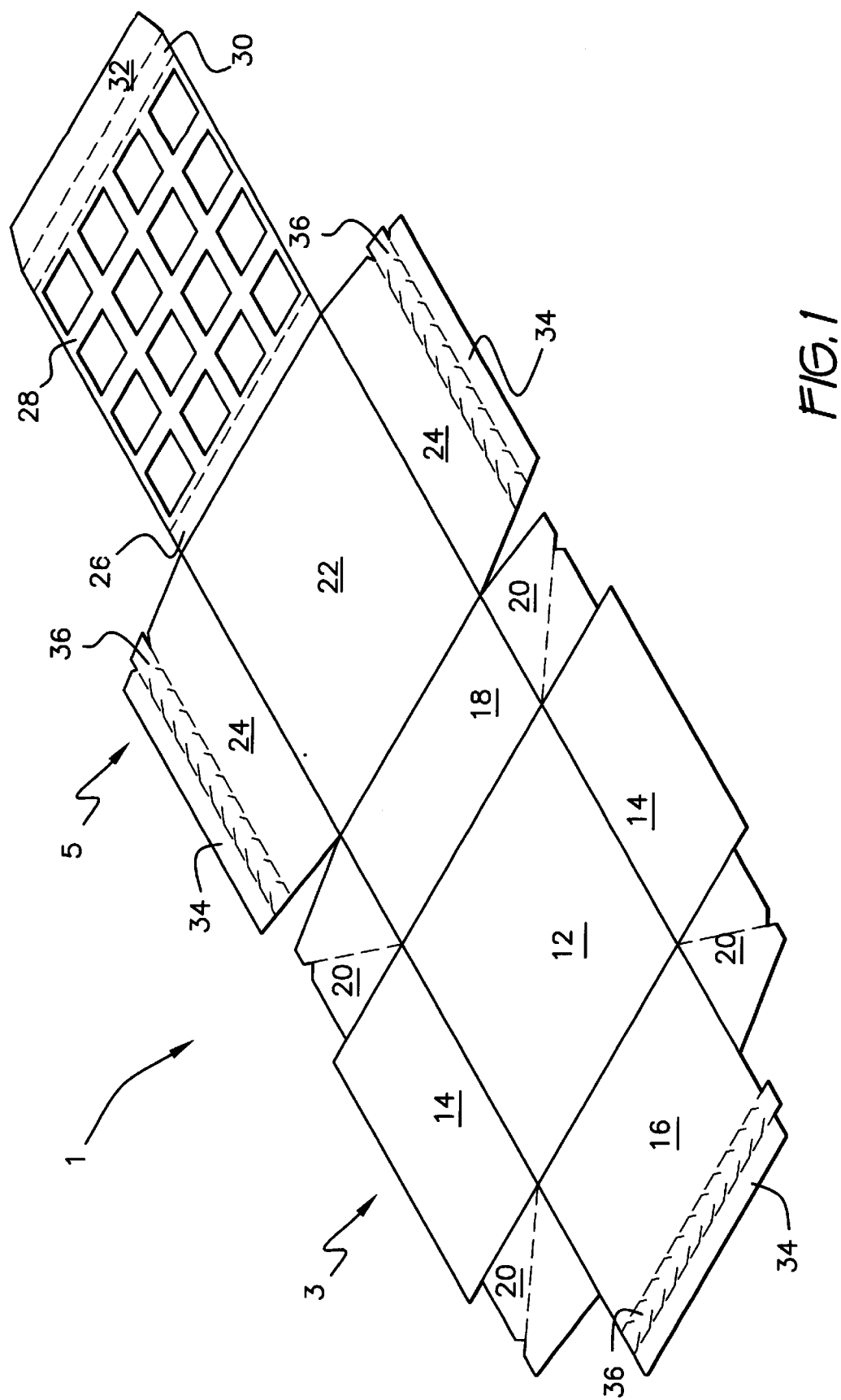
FIG. 1 is a plan view of a flat package blank.

Referring now to FIG. 1, a flat blank for package 1 is depicted. The bowl 3 of package 1 is comprised of bottom 12, two sides 14, front 16, back 18, and four corner folds 20. The lid 5 of package 1 is comprised of top 22, two side flaps 24, front grid riser 26, grid 28, rear grid riser 30 and rear grid flap 32. Front 16 and side flaps 24 each contain a sealing edge 34 and zipper strip 36 for opening the sealed package.

Figure 2:
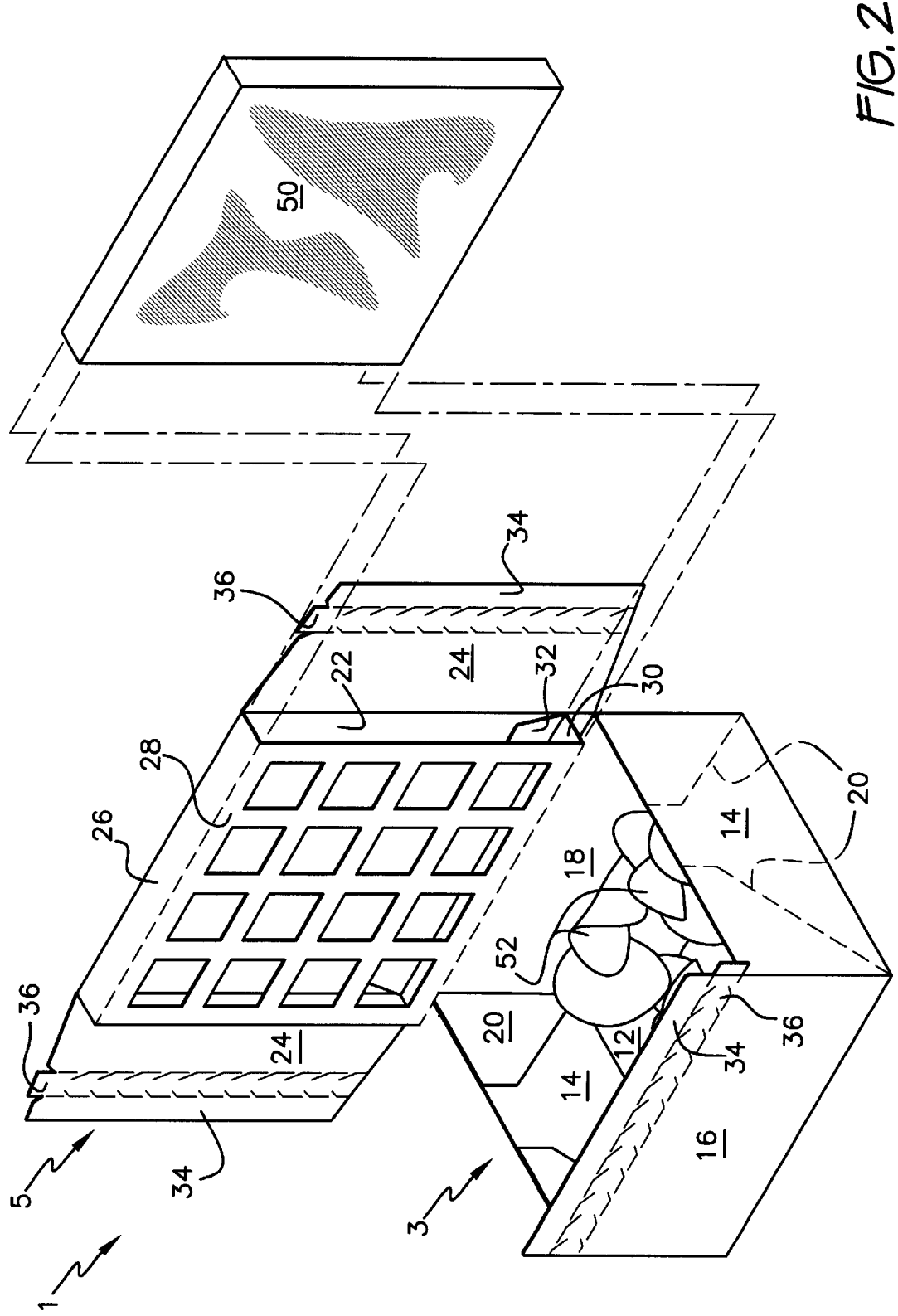
FIG. 2 is an environmental perspective of the invention in an assembled, but not yet sealed state.
Figure 3:
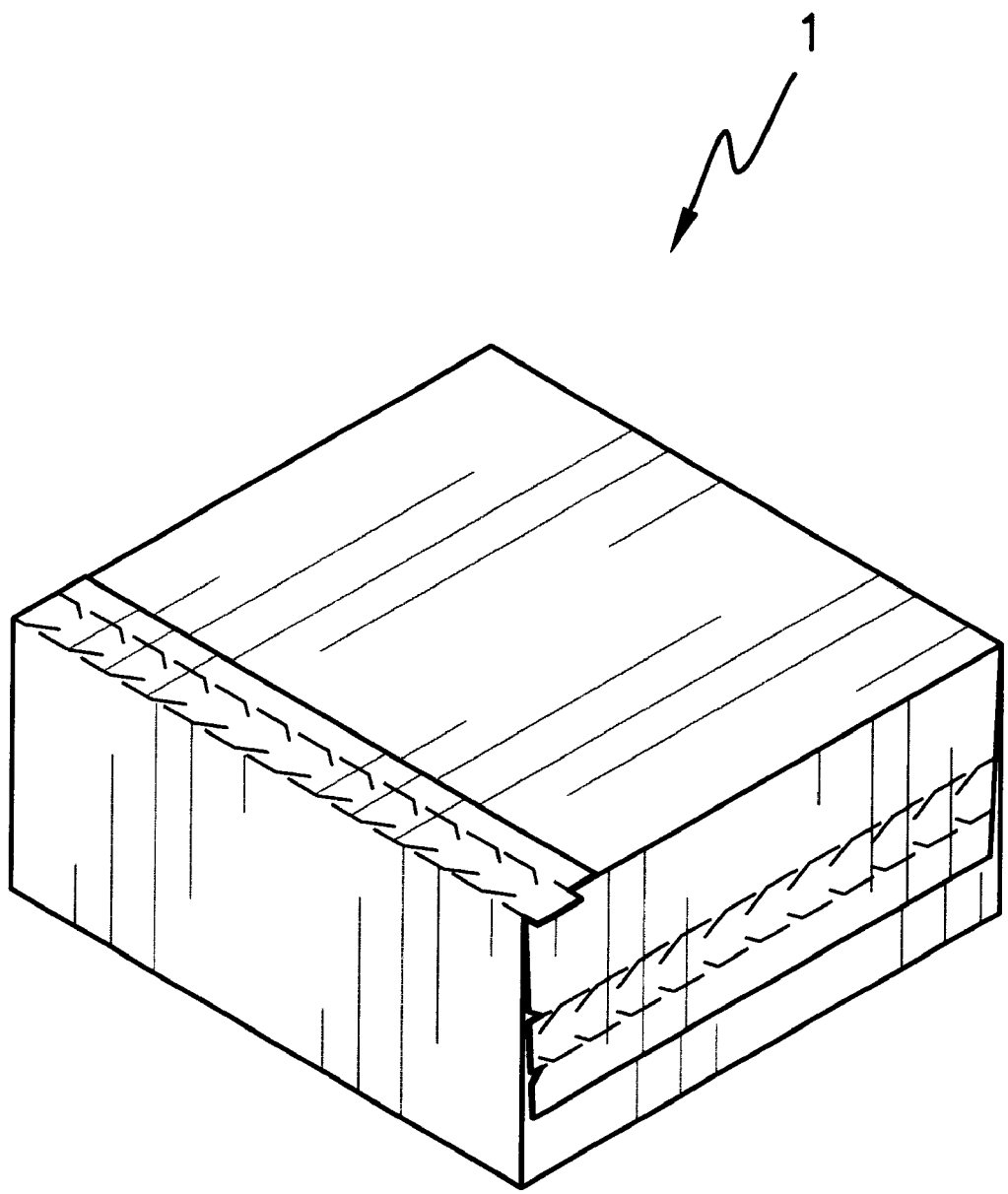
FIG. 3 is an environmental perspective of the invention as a sealed package.

In FIG. 2, the flat blank for package 1 has been folded but is shown prior to being sealed. Corner folds 20 are glued to sides 14 and rear grid flap 32 has likewise been glued to top 22 by one of a variety of methods known to the art. Front grid riser 26 and rear grid riser 30 create a void between top 22 and grid 28 which receives a block of processed nacho cheese 50, which has been sealed with vegetable oil (not shown) to retain moisture. Tortilla chips 52 are placed in bowl 3 prior to sealing package 1, as in FIG. 3, by folding side flaps 24 down over sides 14 and the upper portion of front 16 back over top 22 and securing sealing edges 34.

To prepare the tortilla chips 52 and nacho cheese 50, package 1 is placed in a microwave oven (not shown) and heated. As nacho cheese 50 melts, it drips through the openings in grid 28 onto tortilla chips 52. After the heating is complete, zipper strips 36 along the edges of front 16, and top flaps 24 are pulled to open package 1. Lid 5 can be removed by tearing along its juncture with back 18, leaving only bowl 3 with nacho cheese 50 and tortilla chips 52 inside.

It would be evident to one skilled in the art that package 1 could be produced from a variety of different materials, such as polymeric materials or cardboard.

It would be further evident to one skilled in the art that the size and shape of package 1 could be varied from that illustrated, as long as open grid 28 is provided in lid 5 to retain the nacho cheese 50.

It would also be evident to one skilled in the art that package 1 could be used for food combinations other than tortilla chips and nacho cheese.

It would likewise be evident to one skilled in the art that package 1 could be overwrapped to provide an additional margin of freshness.

It is to be understood that the present invention is not limited to the embodiments described above, but encompasses any and all embodiments within the scope of the following claims.

I claim:

1. A microwavable package formed from a flat blank that is folded to form the package and containing a snack food and topping comprising
a bowl portion further comprising
a bottom,
two sides,
a front, and
a back, and;
a lid portion further comprising
a top,
two side flaps,
a front grid riser and
a rear grid riser, which together support
an open grid, said front grid riser foldably connected to both said top and said grid, and said rear grid riser foldably connected to said grid such that said grid is separated and spaced from said top by said front grid riser and said rear grid riser, said grid being positioned below said top and over said bowl portion,
the void between said top and said grid containing a first, food item, meltable upon exposure to microwave energy, and
said bowl portion containing a second food item upon which said first food item will drip evenly when melted.

2. A microwavable package containing a snack food and topping, as defined in claim 1, wherein
said back and said top are foldably joined as a hinge along their common edge,
said front has, along its upper edge
a sealing edge for sealing said front to said top, and
a zipper strip proximate said sealing edge for opening said front, and
each of said side flaps has along its length opposite said side flaps juncture with said top
a sealing edge for sealing said side flaps to said sides, and
a zipper strip proximate said sealing edge for opening said side flaps.

3. A microwavable package containing a snack food and topping, as defined in claim 1, wherein said first food item is a block of processed nacho cheese, and said second food item is a serving of tortilla chips.

4. A microwavable package containing a snack food and topping, as defined in claim 3, wherein said processed nacho cheese is coated with a vegetable oil to aid in moisture retention.

5. A microwavable package formed form a flat blank that is folded to form the package and containing a snack food and topping comprising a bowl portion further comprising
a bottom,
two sides,
a front, having along its upper edge
a sealing edge for sealing said front to said top, and
a zipper strip proximate said sealing edge for opening said front, and
a back, and;
a lid portion further comprising
a top,
two side flaps, each having along its length opposite said side flaps juncture with said top
a sealing edge for sealing said side flaps to said sides, and
a zipper strip proximate said sealing edge for opening said side flaps,
a front grid riser and
a rear grid riser, which together support
an open grid, said front grid riser foldably connected to both said top and said grid, and said rear grid riser foldably connected to said grid such that said grid is separated and spaced from said top by said front grid riser and said rear grid riser, said grid being positioned below said top and over said bowl portion and wherein said back and said top are joined as a hinge along their common edge, and the void between said top and said grid contains a block of processed nacho cheese,
said nacho cheese being coated with a vegetable oil to aid in moisture retention, and
said nacho cheese being meltable upon exposure to microwave energy, and said bowl portion containing a serving of tortilla chips upon which said processed nacho cheese will melt evenly.

6. A microwavable package containing a snack food and topping, as defined in claim 5, wherein said microwavable package is overwrapped to provide an additional margin of freshness.

* * * * *